United States Patent
Noble et al.

(10) Patent No.: US 9,208,548 B1
(45) Date of Patent: Dec. 8, 2015

(54) AUTOMATIC IMAGE ENHANCEMENT

(71) Applicant: Amazon Technologies, Inc., Reno, NV (US)

(72) Inventors: Isaac Scott Noble, Soquel, CA (US); David W. Stafford, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 199 days.

(21) Appl. No.: 13/888,247

(22) Filed: May 6, 2013

(51) Int. Cl.
   *G06K 9/62* (2006.01)
   *G06T 5/50* (2006.01)

(52) U.S. Cl.
   CPC .......................................... *G06T 5/50* (2013.01)

(58) Field of Classification Search
   None
   See application file for complete search history.

(56) References Cited

U.S. PATENT DOCUMENTS

| | | | |
|---|---|---|---|
| 7,519,200 B2 * | 4/2009 | Gokturk et al. | 382/118 |
| 8,520,979 B2 * | 8/2013 | Conwell | 382/305 |
| 2003/0018631 A1 * | 1/2003 | Lipson et al. | 707/3 |
| 2004/0174434 A1 * | 9/2004 | Walker et al. | 348/211.3 |
| 2006/0015495 A1 * | 1/2006 | Keating et al. | 707/6 |
| 2007/0081744 A1 * | 4/2007 | Gokturk et al. | 382/305 |
| 2008/0071749 A1 * | 3/2008 | Schloter | 707/3 |
| 2009/0083237 A1 * | 3/2009 | Gelfand et al. | 707/4 |
| 2009/0285492 A1 * | 11/2009 | Ramanujapuram et al. | 382/209 |
| 2010/0135582 A1 * | 6/2010 | Gokturk et al. | 382/195 |
| 2014/0164891 A1 * | 6/2014 | Fan et al. | 715/205 |

* cited by examiner

*Primary Examiner* — Li Liu
(74) *Attorney, Agent, or Firm* — Novak Druce Connolly Bove + Quigg LLP

(57) ABSTRACT

Approaches are described for managing the processing of image and/or video data captured by an electronic device. A user can capture an image using a camera of a computing device, where metadata obtained by sensor(s) of the device can be stored along with the image. The image can be transmitted to a network service, where the network service can divide the image into a plurality of image portions, and for each image portion, the network service can search a library of image patches in attempt to find at least one library patch that substantially matches a respective image portion. If one of the library image portions matches the image portion within an allowable threshold, the network service can modify the image portion such as by applying image modifications made to the library image patch to the image portion or merging the library patch image with the image portion.

20 Claims, 7 Drawing Sheets

AUTOMATIC IMAGE ENHANCEMENT

BACKGROUND

As computing devices offer increasing processing capacity and functionality, users are able to operate these devices in an expanding variety of ways. For example, mobile devices are increasingly offering multiple high quality cameras that are capable of capturing high resolution images and/or videos. However, in a number of situations, portable computing devices lack the computing power and/or storage capacity to adequately process the images. Further, due to size, resources, and other limitations of conventional computing devices, although these devices can offer high quality cameras relative to current mobile devices, cameras natively included on such devices are typically lower in quality when compared to other designated cameras, such as digital cameras and single-lens reflex (SLR) cameras. The lower quality of images produced by computing device cameras can reduce the overall user experience associated with using computing devices. Accordingly, users are increasingly turning to network resources, such as remote servers executing "in the cloud" to perform various tasks, such as to store and process data and process programs. As cloud-based computing services continue to evolve and provide enhanced processing power, greater storage, faster networks, and ubiquitous access to one's data, the utility to uses likewise increases.

BRIEF DESCRIPTION OF THE DRAWINGS

Various embodiments in accordance with the present disclosure will be described with reference to the drawings, in which.

DETAILED DESCRIPTION

Figure 1:
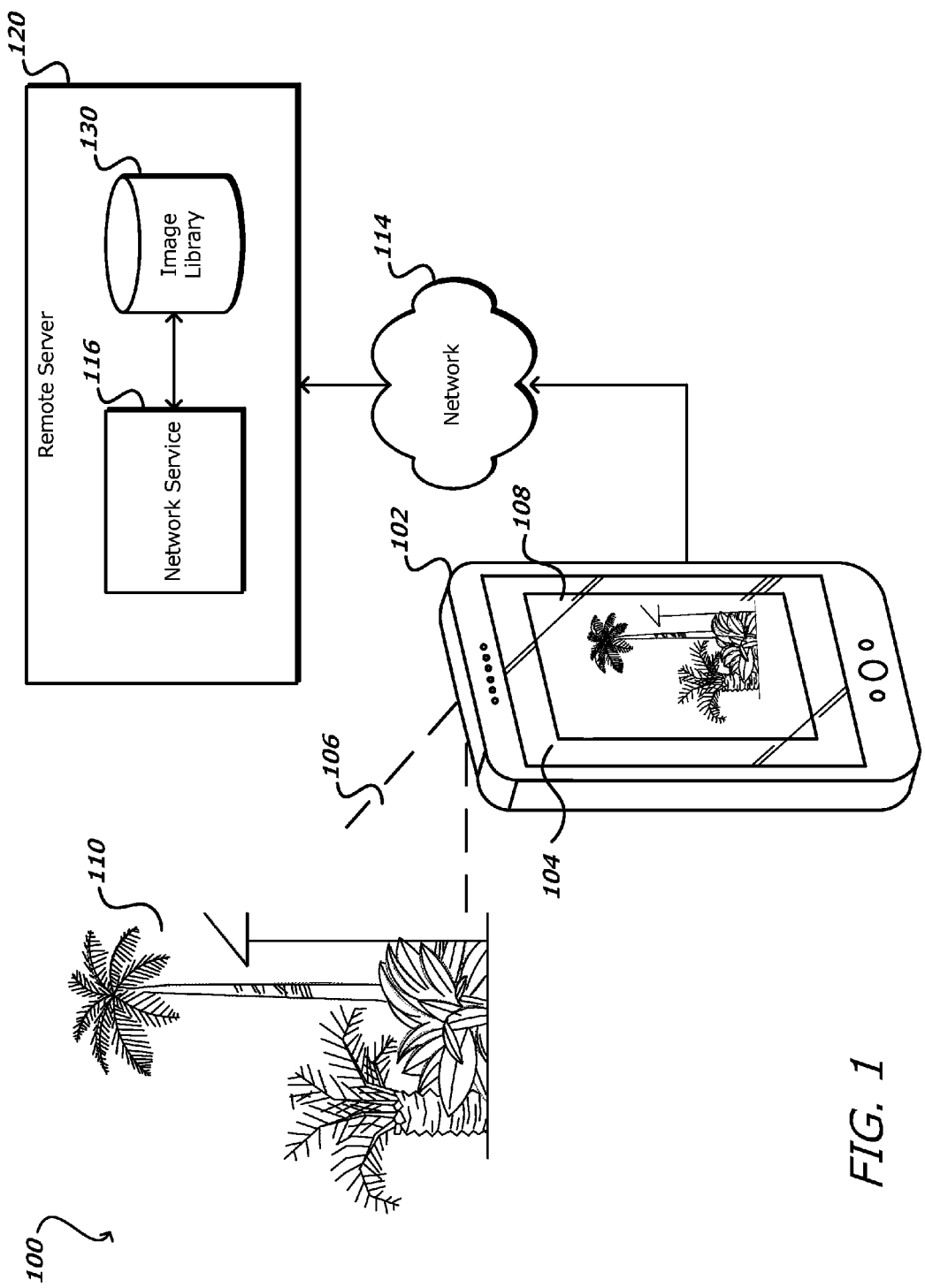
FIG. 1 illustrates an example environment in which aspects of the various embodiments can be utilized.

Systems and methods in accordance with various embodiments of the present disclosure overcome one or more of the above-referenced and other deficiencies in conventional approaches to creating and/or processing image and/or video data. In particular, various embodiments enable a network service (i.e., a network image service, image service, etc.) to enhance an image and/or video such as to improve a quality, resolution, sharpness, color depth, or other such aspect of the image and/or video. For example, a user can capture an image using a camera of a computing device (e.g., a mobile phone, tablet computer, etc.) or other electronic device, where data obtained by one or more sensor of the device can be stored as metadata along with the image. The metadata can include positioning information, orientation information, and/or temporal information, among other types of information. The image and metadata can be uploaded to a network system or service, such as may be executing in a shared resource environment or "in the cloud," for processing. In at least one embodiment, the network service can attempt to produce an enhanced image, such as to improve a quality, resolution, sharpness, color depth, and/or other such aspect of the image.

In at least one embodiment, a network service can perform a portion-by-portion analysis of the image (also referred to as the source image), where the network service can divide or otherwise logically segregate the source image into a plurality of image portions. For each image portion, the network service can search a library of image portions or "patches" in attempt to find at least one library image patch that substantially matches a respective image portion. As used herein, an image patch refers to at least a portion of at least one object represented in an image having undergone at least one image modification. If one of the library image patches matches the respective image portion within an allowable threshold, matching criterion, or other such parameter, the network service can modify the respective image portion using the matching image patch. The modification can include, for example, determining image modifications that were made to the library image patch and then applying one or more similar modifications to the image portion. For example, if the sharpness, contrast, and hue were adjusted on the library image patch, the same or similar adjustment(s) can be made to the corresponding image portion. The network service (or another such system, component, or process) can repeat this process of library image patch matching and image portion modifying in order to generate an enhanced version of the source image. Thereafter, the enhanced and source image can be provided to the device from the network service, where the user can be prompted to accept, save, and/or discard either image. Other approaches can be utilized as well, such as to enable the subsequent viewing and utilizing of the enhanced image. The accepted (and in some instances the discarded) images can be stored on the computing device and/or on a database in communication with the network service, among other such options. Various other functions and advantages are described and suggested below as may be provided in accordance with the various embodiments.

As mentioned above, computing devices often include one or more cameras that are capable of capturing images and/or videos. However, many of these devices lack the computing power and/or storage capacity to adequately process the images as compared to the processing capability of desktop or server-based systems. Further, due to size, resources, and other limitations of conventional computing devices, the cameras natively included on such devices are typically lower in quality when compared to other designated cameras. As such, it can be desirable to provide access to more powerful resources that allow for computationally intensive image processing applications directly from a user's computing device. Accordingly, since users are increasingly uploading image and video data from their computing device to remote servers, such as cloud-based photo albums having cloud-computing resources, these resources can be used to perform image processing not supported by the user's computing device. Accordingly, systems and methods in accordance with various embodiments enable a network service (i.e., a network image service, image service, etc.) to enhance an image and/or video such as to improve a quality, resolution, sharpness, color depth, or other such aspect of the image and/or video.

FIG. 1 illustrates an example environment in which aspects of the various embodiments can be utilized. As shown example environment 100 of in FIG. 1, a portable computing device 102 is in communication with a remote server 120 executing across at least one network. The portable computing device includes, for example, a camera, an interface 104 (e.g., a display element) that displays the field of view 106 of the camera. The device can be aimed in different directions and the interface can display an image or video of the current/active field of view being captured by the camera. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers; personal data assistants; cellular phones; video gaming consoles or controllers; portable media players; wearable computing devices such as smart watches, smart glasses; among others. The device can include other elements useful for imaging as well, such as a light sensor for determining an amount of ambient light and a white light LED, or other such illumination element, useful in illuminating objects within at least a portion of a field of view of the camera. The remote server can be part of a shared resource or multi-tenant environment, and can be any type of server such as an application server, a web server, etc.

A user of the computing device can use the camera to capture an image 108 of a scene or subject matter(s) of interest 110. The image can be transmitted over a network 114 to a network service (e.g., networked image service) 116 operating on a remote server 120 for processing. The image can be transmitted along with metadata associated with the image (e.g., data tagged with the image, information related to the image, etc.). As described, the metadata can be obtained by sensor(s) of the device and can be stored along with the image.

For example, a global positioning sensor of the computing device can determine information of where the image was captured and the location information can be stored in metadata associated with the image. In this situation, a global positioning system (GPS) chip, radio signal multilateration system, cellular triangulation sensor, or other global positioning sensor of the device can be configured to determine a geolocation of the computing device at substantially the same time (e.g., within an allowable time period) as when the image was captured by the camera of the computing device. In a further example, the computing device can present a user interface configured to receive input from the user of the device, such as to "tag" or otherwise specify a subject matter of at least a portion of the image by providing a description of the portion of the image and the information can be stored in metadata associated with the image. In this situation, the user can input data that indicates a subject matter included in the image. For example, the user can specify a subject matter (e.g., nature, giant *sequoia*, etc.) for the entire image. In another example, the user can specify a subject matter for a portion(s) of the image (e.g., branch, leaves, etc.). In a further example, if a face of a person is included in the image, then an identifier or tag such as a name (e.g., "Joe Smith", "Jane Smith", etc.) for the face or other aspect of the identified person in the image can be included in the metadata associated with the image.

It is further contemplated that a person of ordinary skill in art will recognize various other information that can be included with and/or indicated by the metadata. For example, an orientation sensor(s) of the computing device can determine a direction at which a camera of the device is facing when an image is being captured by the camera of the device, and the orientation information can be stored in metadata associated with the image. In this situation, the direction can be determined using at least one of a gyroscope, an accelerometer, a compass, among others of the device. In another example, the computing device can also utilize system settings (e.g., system clock/calendar) to determine a temporal property (e.g., time of day, date, season, etc.) of the image when captured, and the temporal information can be stored in metadata associated with the image. In this situation, the temporal aspect can include a time of day, a day of the week, a calendar date, a season of the year, etc., determined using, for example, a system clock/calendar of the device.

As described, the image and associated metadata can be transmitted from the computing device over the network (e.g., Internet, intranet, LAN, WLAN, etc.) to the network service. The network service can provide network infrastructure and resources for running various applications and/or other computing operations. The network service can communicate with a database 130 that includes one or more image and/or patches of images. The images can include entire scenes and/or objects, or portions of those scenes or objects. In accordance with various embodiments, the images can be user provided images, images obtained from one or more social networks, images obtained from an online service, images obtained from a digital image aggregator service and/or application, etc. The images can include images of objects, scenes, people, etc. In some instances, the images may be high-quality images. Factors that can contribute to the quality of the image can include lens type, camera sensor type (e.g., camera resolution), image processor component, and photograph skill level of the photographer. Additionally or alternatively, the images can include images that have been enhanced through an image enhancement processes. This can include, for example, adjusting each of the images (or portions of the images) by one or more human image enhancement experts, or other image editing processes. In various embodiments, this can include using a panel of human experts to modify one or more image characteristics of the images, wherein adjusting the image can include adjusting the entire image or portions thereof. This can also include non-experts such as any person (or process) capable of editing an image. The images can be segmented into a plurality of patches of a same or differing size and these patches can be improved by human experts (or non-experts). The adjusted patches can be linked to the original unimproved patches of the same image. Additionally, in many embodiments, the procedure by which the patches were modified can be stored in the database.

In accordance with various embodiments, the image captured by the device can be provided to the network service in a number of ways. For example, users of the service can voluntarily provide images such as by indicating through a service preference or other preference that images uploaded to the service (or a subset of the images uploaded to the service) can be used for such purposes. Additionally or alternatively, the service can use images obtained in-house, publically available images, images obtained for social networks, among others.

As describe, the network service can be configured to process the image to generate an enhanced version of the image. In some embodiments, the network service can provide the user (e.g., via the user's computing device) with access to the enhanced image version. For example, the network service can transmit the enhanced image back to the user and/or the user's device. In another example, the network service can provide a link to the user or user's device for accessing the enhanced image. Similarly, the user can access an account or network service, such as a network web photo album to access images enhanced by the service.

Figure 2:
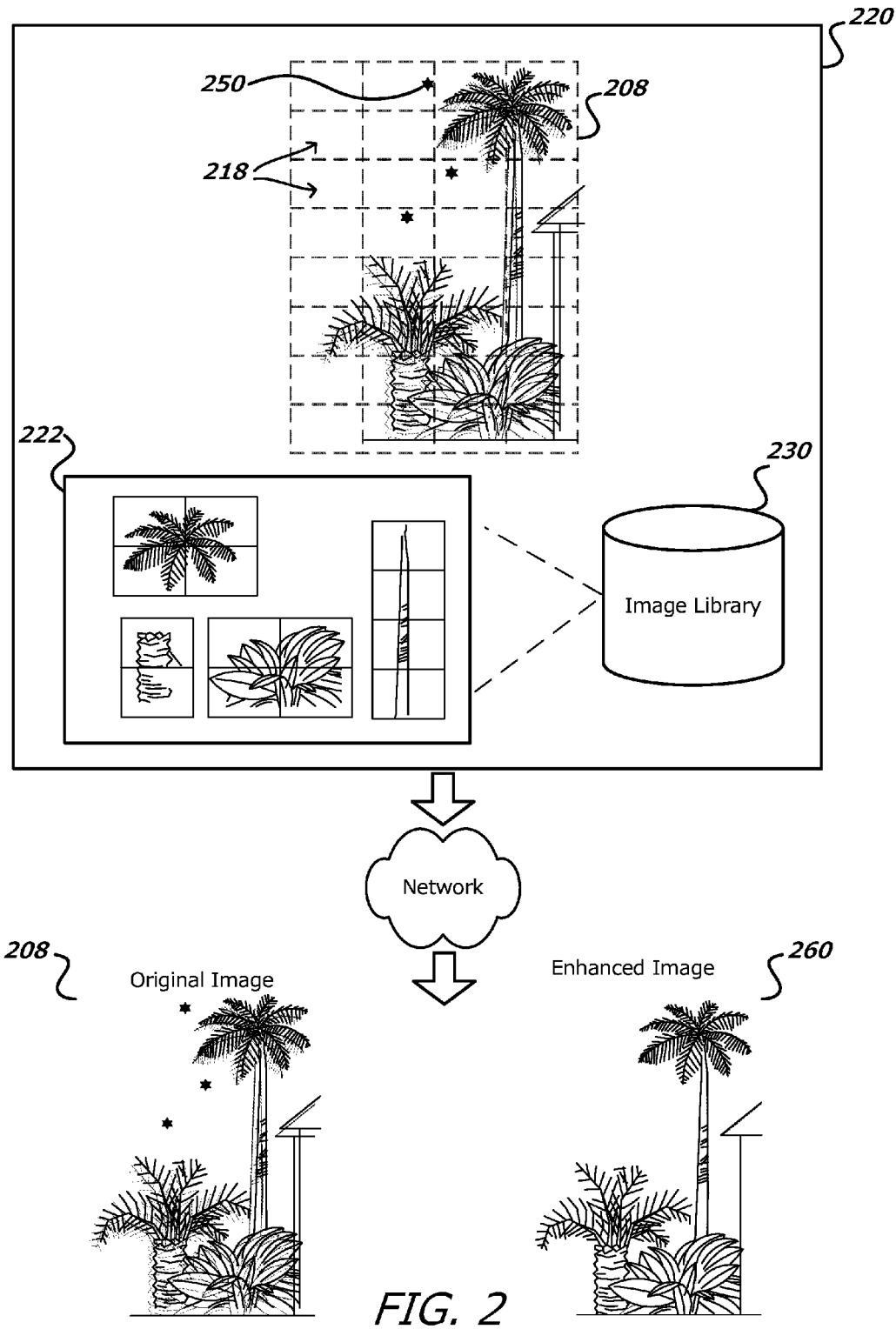
FIG. 2 illustrates an example system embodiment for enhancing an image in accordance with an embodiment.
Figure 3A:
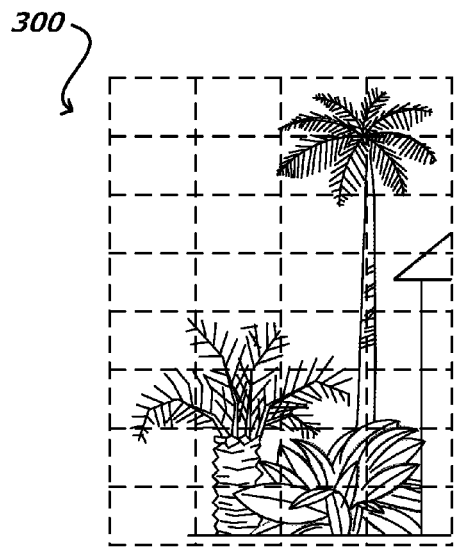
FIGS. 3(a), 3(b), 3(c), and 3(d) illustrate example image segmentation approaches in accordance with various embodiments.
Figure 3B:
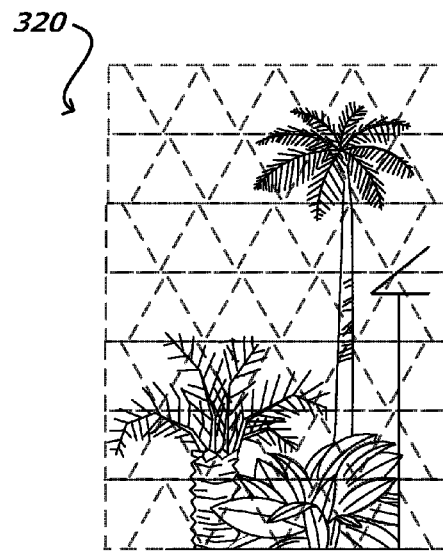
Figure 3C:
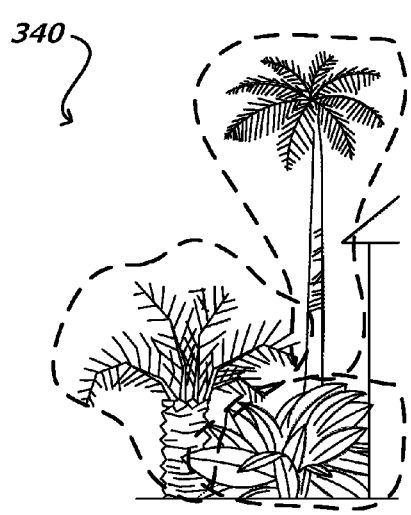
Figure 3D:
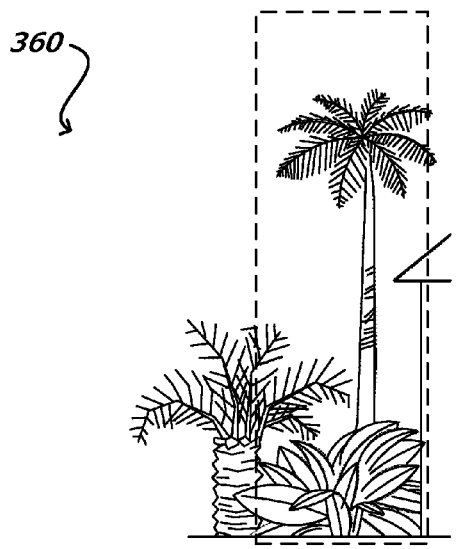

FIG. 2 illustrates an example implementation for creating and/or processing an image in accordance with an embodiment. As shown in FIG. 2, a remote server 220 includes an image library 230 and at least one image 208 captured by a computing device that has been transmitted to the remote server. Also transmitted with the image can be metadata (e.g., data tagged with the image, an image property, etc.). The metadata related to the image can be obtained and/or generated via the computing device. As mentioned above, the metadata can include (but is not limited to) geolocation information at substantially where the image was captured, a direction at which the camera of the device was pointing while capturing the image, a time of day/year when the image was captured, data inputted by the user to provide one or more details about the image, and/or other information related to the image.

Operating on the remote server is a network service (not shown) configured to enhance the image. The network service can receive the image and the metadata and can process the image in attempt to generate an enhanced version of the image. For example, the network service can virtually divide the received image into one or more image portions 218. For example, the network service can select an image portion size (e.g., 5×5 pixels, 10×10 pixels, etc.) and can analyze the image with respect to a plurality of image portions at the selected size. In some embodiments, the network service can then create a copy of each image portion and process each copy of the image portion such that the original image does not get unintentionally modified.

In accordance with various embodiments, the image patch library can be an electronic storage unit configured to store a plurality of image patches. In some embodiments, the image patch library can reside with the network service, while in other embodiments the image patch library can reside at one or more servers external to the network service. As described, the images can include entire scenes and/or objects, or portions of those scenes or objects. The images can be images that have been enhanced through an image enhancement processes. This can include, for example, adjusting each of the images (or portions of the images) by one or more human experts or other automated image editing processes. In various embodiments, this can include using a panel of human experts to modify one or more image characteristics of the images. For example, the images can be segmented into a plurality of patches of a same or differing size and these patches can be improved by human experts. The adjusted patches can be linked to the original unimproved sections of the same image. Additionally, in many embodiments, the procedure by which the sections were modified can be stored in the database.

In some embodiments, each image patch can be part of a respective image patch group. For example, each image patch group can include multiple versions of the same image, where each version has undergone a different enhancement. Additionally or alternatively, the image patch group can include related or similar images, where the image can be of the same object captured from different viewpoints. Additionally, the image patch group can include similar images or images that share at least one or more common features. Further still, the image patch group can include a lower resolution image patch and a higher resolution image patch. As such, the image patch group in this example can be an image patch pair comprising a "lo-res" patch and a "hi-res" patch (also referred to as a "lo-res-hi-res pair").

The network service can communicate with the image patch library to perform image patch matching. In some embodiments, image patch/portion matching can include comparing one or more pixels of a first image portion (e.g., source image portion) to one or more pixels of a second image patch (e.g., library image patch) to, for example, determine a similarity in at least one image aspect (e.g., pixel color, pixel hue, pixel brightness, etc.). For example, a set of pixels of the first image portion can substantially match or correspond to a set of pixels of the second image patch if the two sets are sufficiently similar (e.g., within an allowable deviation) with respect to one or more pixel aspects (e.g., pixel color, pixel hue, pixel brightness, etc.). In some embodiments, image patch/portion matching can be performed utilizing, at least in part, line detection, edge detection, feature detection, image color comparison, image texture comparison, image shape comparison, image distance measurement, and/or other image processing techniques.

Further, a number of other approaches can be used to determine how similar two images or image patches/portions are. For example, the level of similarity can be determined using a correlation algorithm (such as a cross-correlation algorithm). For example, in one instance, the integer components of an image portion's brightness at each pixel can be used in a cross-correlation algorithm to determine the level of similarity between the image portion and the image patch. In another instance, each pixel can be treated as a vector (e.g., in the case of color images), the vectors can be normalized, for example, to account for at least some variation in brightness due to light and exposure conditions, and the cross-correlation between the two images can be computed. The result can be a value between 0 and 1, and the result can be used to indicate a percent similarity of the two images. The result can be compared to a predetermined threshold, where in some embodiments, the threshold indicates a level of acceptable similarity. For example, a result above 85 percent can be used to indicate that the images are similar.

Further still, the level of similarity can be determined using perceptual hash algorithms. Perceptual hash algorithms describe a class of comparable hash functions, and one or more features in an image can be used to generate a distinct (but not unique) fingerprint, and these fingerprints can be compared. For example, the fingerprints determined in the image portion can be compared to the fingerprints of the image patch to determine the level of similarity between the images. It should be noted that it is well understood how to determine a level similarity between images and/or image patch/portions, and that in accordance with an embodiment, various algorithms can be used to determine how similar one image is to another image, such as perceptual hash algorithms or other comparable hash functions, key point matching algorithms, histogram matching algorithms, among others.

For one or more of the image portions for the image, the network service can search for one or more unimproved patches that substantially matches (i.e., matches within an allowable threshold) a respective image portion. If a matching unimproved patch is found for a respective image portion, the respective image portion can be modified using an enhanced patch that corresponds to the matching unimproved patch (i.e., the enhanced patch is in the same patch group/pair as the unimproved patch). In some embodiments, the respective image portion can be modified using (e.g., replaced by, merged with, etc.) the enhanced patch corresponding to the unimproved patch that matches the respective image portion. In one example, merging can include comparing a set of pixels in the enhanced patch with a corresponding set of pixels in respective image portion and determining middle (e.g., median, mean, somewhere in between, etc.) values (e.g., pixel color values) between the pixels in the enhanced patch and the corresponding pixels in the respective image portion. In another example, merging can include combining an area of the enhanced patch with a related (e.g., adjacent, nearby, etc.) area of the respective image portion which has no corresponding enhanced patch.

In other embodiments, rather than use the enhanced patch from the database, the network service can use stored procedure information from the database for how the enhanced patch was modified and apply that procedure to the image portion. The procedure can be applied to the image portion based at least in part on how well the image portion matched the unimproved patch. For example, if the patches have a similarity above a determined threshold, substantially the same procedure can be applied. In this way, the procedure can be applied based on the relative match between the image portion and the database patch. In other instances, the procedure method can be performed stochastically where the procedure can be modulated by image properties of neighboring image portions such that similar procedures are applied to neighboring image portions or the procedure applied to the target portion is modified to blend with the neighboring portions. For example, the modifications applied to a portion can be blended across one or more neighboring portions such that each region of portions includes some set of filters and color correction. In this instance, the amount of modifications performed on neighboring portions can be based at least in part on how similar the neighboring portions are to the database patch. In this situation, if two neighboring portions are very different, the type and intensity of modification might diverge from what is applied to the target portion.

Further, each filter can include one or more rules indicating how the rule is applied based on the portion to which the filter will be applied. For example, a filter can include a rule to apply a smoothing algorithm to the image portion and neighboring image portions if the level of brightness of the target portion is greater than a threshold level of brightness to its neighboring image portions. Additionally, a rule can limit the amount of brightness adjusted for a particular portion if, for example, the level of brightness of the target portion is greater than a threshold level of brightness to its neighboring image portions.

Various embodiments of the present disclosure can enable the network service to take into consideration the metadata related to the image and select a subset of image patches in the library such that the subset comprises image patches that are associated with the metadata. In one example, if the metadata indicates that the image was captured at the Grand Canyon, then the subset can be selected to include only those image patches that are associated with the Grand Canyon (e.g., only image patches that are part of images that were captured at the Grand Canyon). As such, the utilization of the metadata related to the image to select the subset can significantly improve the quality, accuracy, as well as speed of image patch matching because the subset can be chosen to be more narrowed/limited, but also more relevant.

In one example, the network service can perform patch/portion matching for a particular image portion of the image. The network service can communicate with the image patch library to select the relevant subset 222 of image patches based on the metadata related to the image. In this example, the metadata can indicate that the image (and/or image portion) is of one or more trees. Accordingly, the subset can be selected to include image patches that are associated with trees or plant life. The subset can be searched in attempt to identify one or more image patches that substantially match the particular image portion.

The service can determine an image patch, from the subset, that substantially matches the image portion of the image. If image patch is of a better image quality than image portion, then the patch can be used to modify (e.g., replace, merge with, etc.) the image portion. In some embodiments, if image patch is associated with an enhanced version (e.g., if image patch is in an image patch group/pair that contains an enhanced patch that corresponds to image patch), then the enhanced version patch can be used to modify (e.g., replace, merge with, etc.) the image portion. This process can be repeated one or more of the other image portions of the image.

In some embodiments, the network service can attempt to determine matching patches for smaller image portions and then progress to larger image portions. For example, the service can first select the size of image portions for the image to be smaller (e.g., 5×5 pixels), perform patch matching for the smaller image portions, select a larger image portion size (e.g., 10×10 pixels), then perform another patch matching for the larger image portions, and so forth.

Further, in some embodiments, the metadata can be used to apply one or more automatic corrections to the image. For example, some cameras leave artifacts 250 or other errors in the image due to how the lens and pixels interact. This can include, for example, color tint and sharpness issues, among others. The metadata can include information such as camera model and lens information and this information can be used by the network service to apply one or more image processes to correct for such errors specific to the camera and lens information.

The enhanced image 260 can be provided to the computing device from the remote server, and the enhanced and/or the original image can be presented to the user. The user can be presented a prompt on whether to accept, save, or discard either image. The accepted (and in some instances the discarded) images can be stored on the computing device and/or the remote server, such as in a database located on or separate from the remote server. In accordance with an embodiment, the images stored on the remote server can be made accessible to the computing device. For example, the user may have created an account with a service that provides a cloud-based photo album, and the user can decide to store certain images in the cloud-based photo album.

As described, in various embodiments, the network service can be configured to divide the received image into one or more image portions of any shape, size, and/or orientation. For example, FIGS. 3(*a*), 3(*b*), 3(*c*), and 3(*d*) illustrate different approaches that can be used to divide the image into one or more image portions. As illustrated in example 300 of FIG. 3(*a*), the network service can segment the image into square portions. The square portions can be any size, such as a 5×5 pixel square, a 10×10 pixel square, among others. The database can include similar sized patches, both unimproved and human improved patches, and the image portions can be matched to the unimproved patches in the database. Further, other shapes and sizes can be used in accordance with various embodiments, such as rectangles, circles, etc. For example, example 300 of FIG. 3(*b*) illustrates the situation where the network service segmented the image into triangle portions. As described in regard to the square portions, the triangle portions can vary in size. Further, the database can include similar sized patches (e.g., both unimproved and human improved patches), and the network service can match the image portions to the unimproved patches in the database. In accordance with other embodiments, the image can be segmented into different regions or shapes, such as one of the periodic shapes or patterns described in FIG. 3(*a*) or 3(*b*), or an irregular shape or pattern, such as that illustrated in example 340 of FIG. 3(*c*). In this example, the image can be segmented into one or more shapes that best encompass one or more identified objects in the image, where in some situations the regions or shapes can overlap. As described elsewhere herein, the objects can be identified using object recognition algorithms (e.g., edge detection algorithm, Harris corner algorithm, etc.), and based on the size and/or shape of the object, the image can be segment into portions that encompass those objects. In the situation where one or more objects overlap, the associated region and/or shape may overlap. In various embodiments, the user may indicate an object of interest in the image such as by "tapping" the object displayed on the screen, tagging the object, or otherwise indicating the object of interest. For example as illustrated in example 360 of FIG. 3(*d*), the user has indicated the tree as the object of interest. In this situation, a shape encompassing the tree can be used as the image portion. The service can search the database for similar sized patches to determine an unimproved patch matching the image portion.

Figure 4:
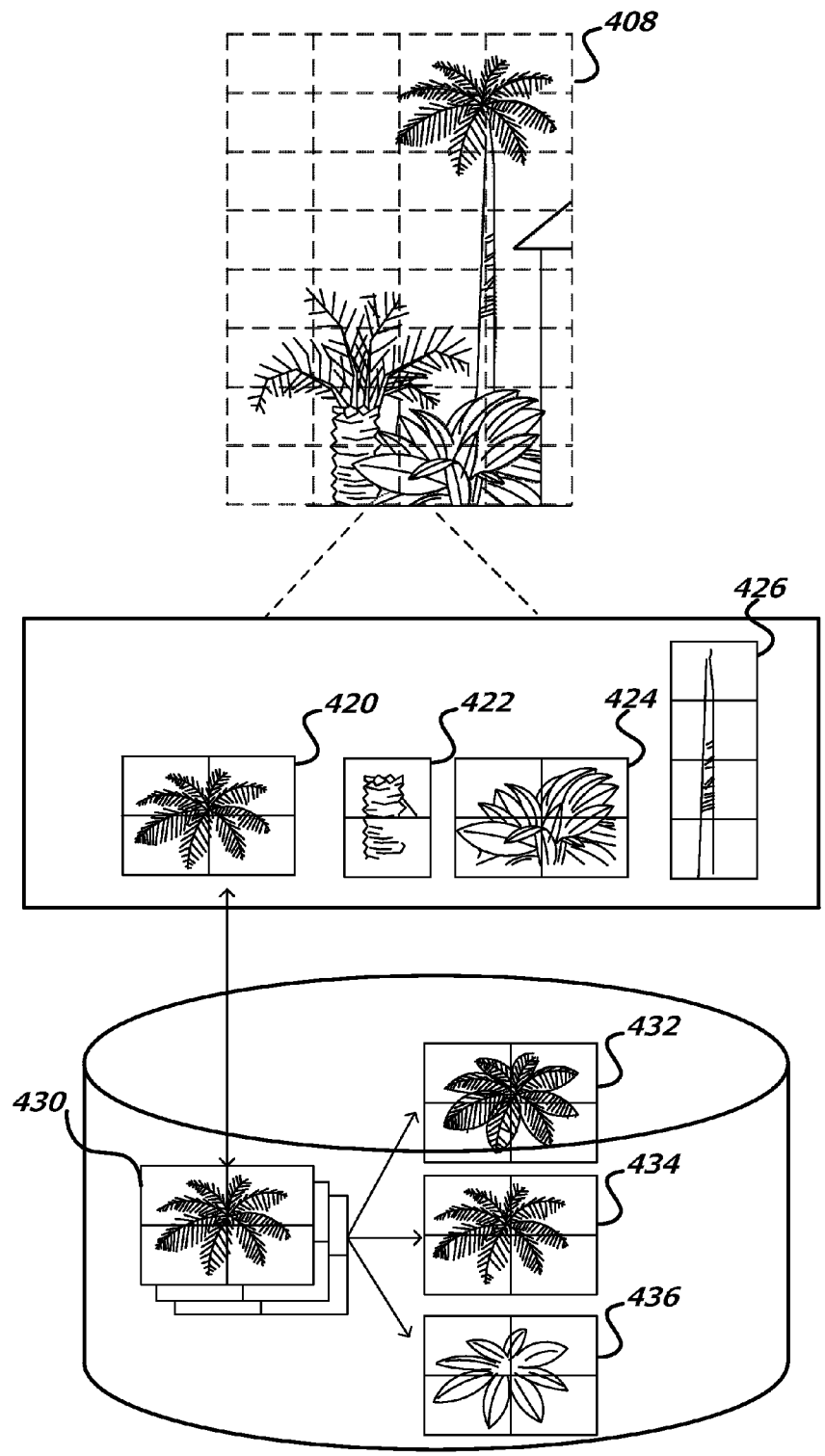
FIG. 4 illustrates an example group of patches useful for image enhancement in accordance with an embodiment.

In some embodiments, each image patch can be part of a respective image patch group. For example, each image patch group can include multiple versions of the image patch, where each version has undergone a different enhancement. Additionally or alternatively, the image patch group can include related or similar patches, where the patch can be of the same object captured from different viewpoints or of similar objects that share at least one or more common features. For example, FIG. 4 illustrates an example group of image patches useful for image enhancement. As shown in FIG. 4, an image 408 captured by a computing device has been segmented into one or more portions, and objects 420, 422, 424, and 426 have been identified in the portions. As described, one or more of the image patches (or groups of patches encompassing an object) can be part of an image patch group. For example, patches matching the image portions that make up object 420 can be part of an image patch group 430, where the image patch group can include one or more versions (432, 434, 436) that make up the image patch group. The network service can perform image patch matching to determine which version is most similar to the image portions. As described, image patch/portion matching can include comparing one or more pixels of a first image portion (e.g., source image portion) to one or more pixels of a second image portion (e.g., library image portion) to, for example, determine a similarity in at least one image aspect (e.g., pixel color, pixel hue, pixel brightness, etc.). If one of the library image patches matches the image portion within an allowable threshold, the network service can modify the image portion using the matching library image patch such as applying image modifications made to the enhanced library image patch to the image portion or by merging the enhanced image patch with the image portion.

In some embodiments, the example image patch group can be an image patch pair comprising a lower resolution image patch and a higher resolution image patch (i.e., lo-res-hi-res pair). Accordingly, in order to enhance the image, the network service can, at least in part, modify the image portion using the image patch and/or the higher resolution version(s) (e.g., of the image patch). For example, the image portion can be replaced by, merged with, or otherwise modified using the image patch if the image patch has a better image quality (e.g., resolution, sharpness, brightness, color, etc.) than image portion.

In various other embodiments, the matching of image patches to image portions can be processed in an increasing order of image patch resolutions. For example, lower resolution image patches can be searched for first to identify patches that match a given image portion. Continuing with the example, subsequently, higher resolution image patches can be analyzed to determine whether or not they match the given image portion. Further, even higher resolution patches can be compared with the given image portion to check for matching. The network service can select the highest resolution image patch that still matches the given image portion within an allowable threshold. The selected highest resolution image patch that still matches the given image portion can be used to modify and enhance the given image portion.

Figure 5:
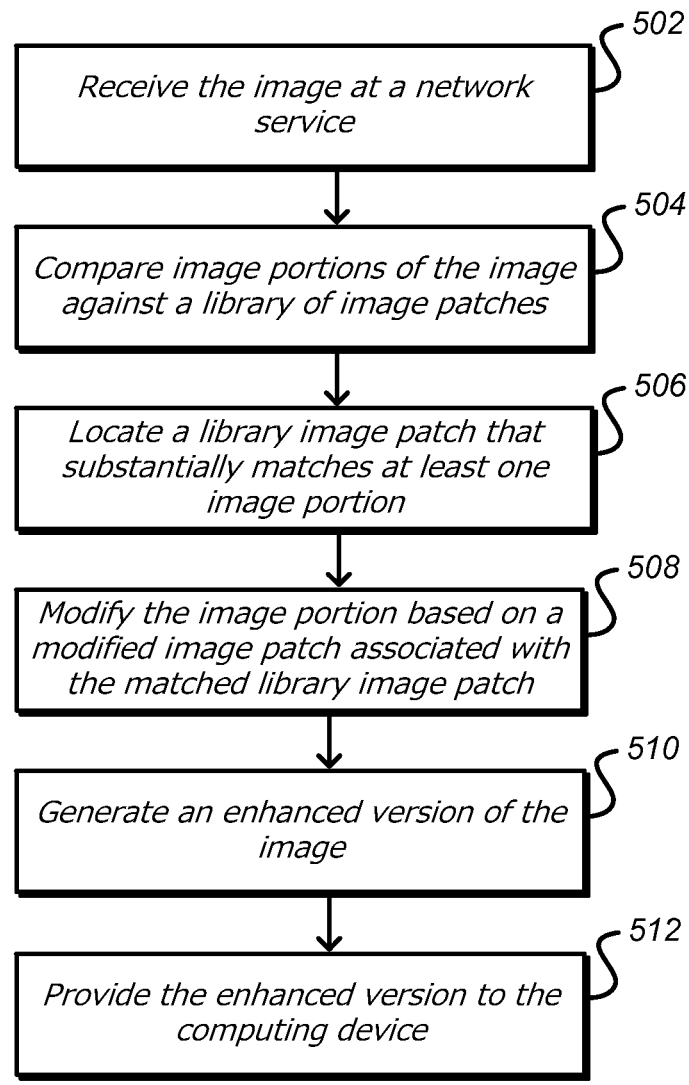
FIG. 5 illustrates an example process for enhancing an image in accordance with an embodiment.
Figure 6:
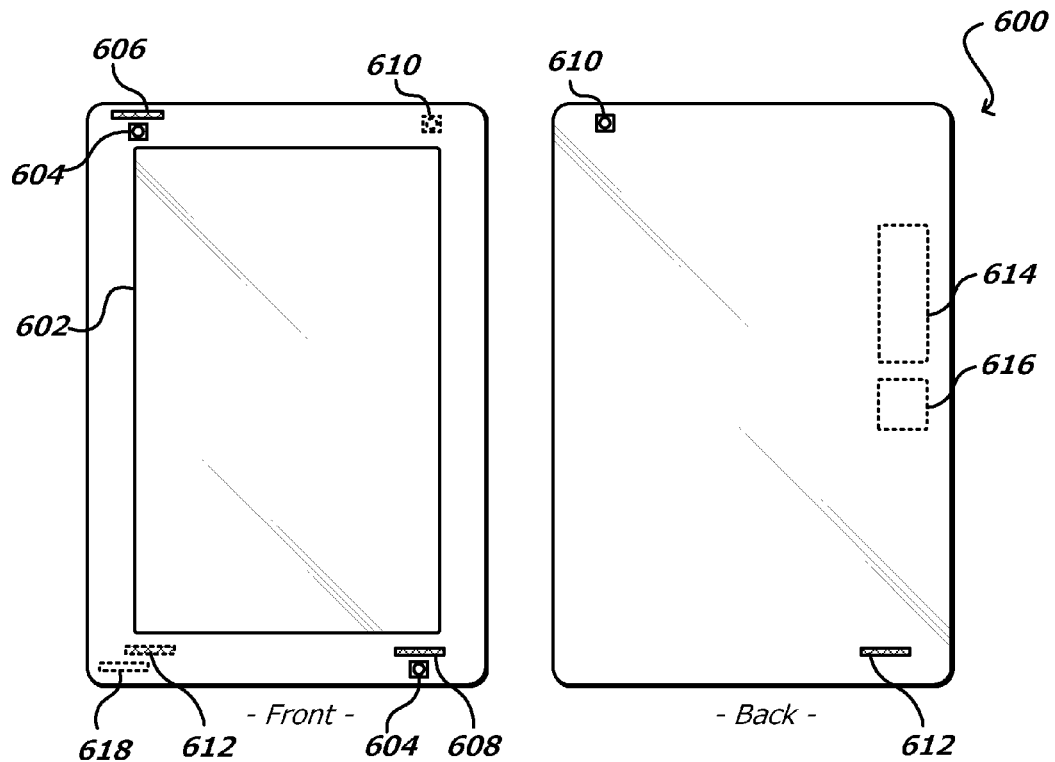
FIG. 6 illustrates an example device that can be used to implement aspects of the various embodiments.
Figure 7:
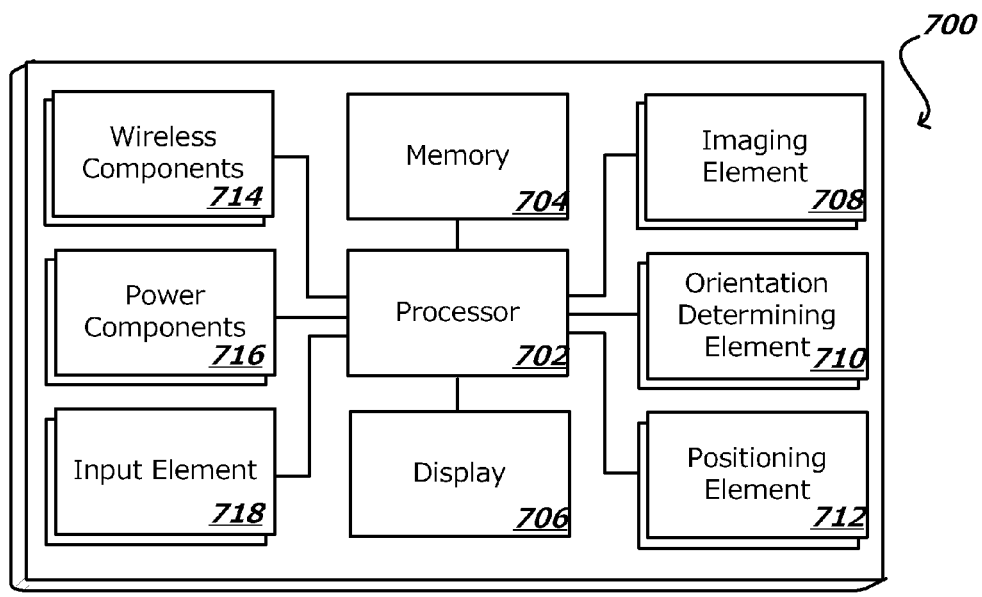
FIG. 7 illustrates example components of a client device such as that illustrated in FIG. 6.
Figure 8:
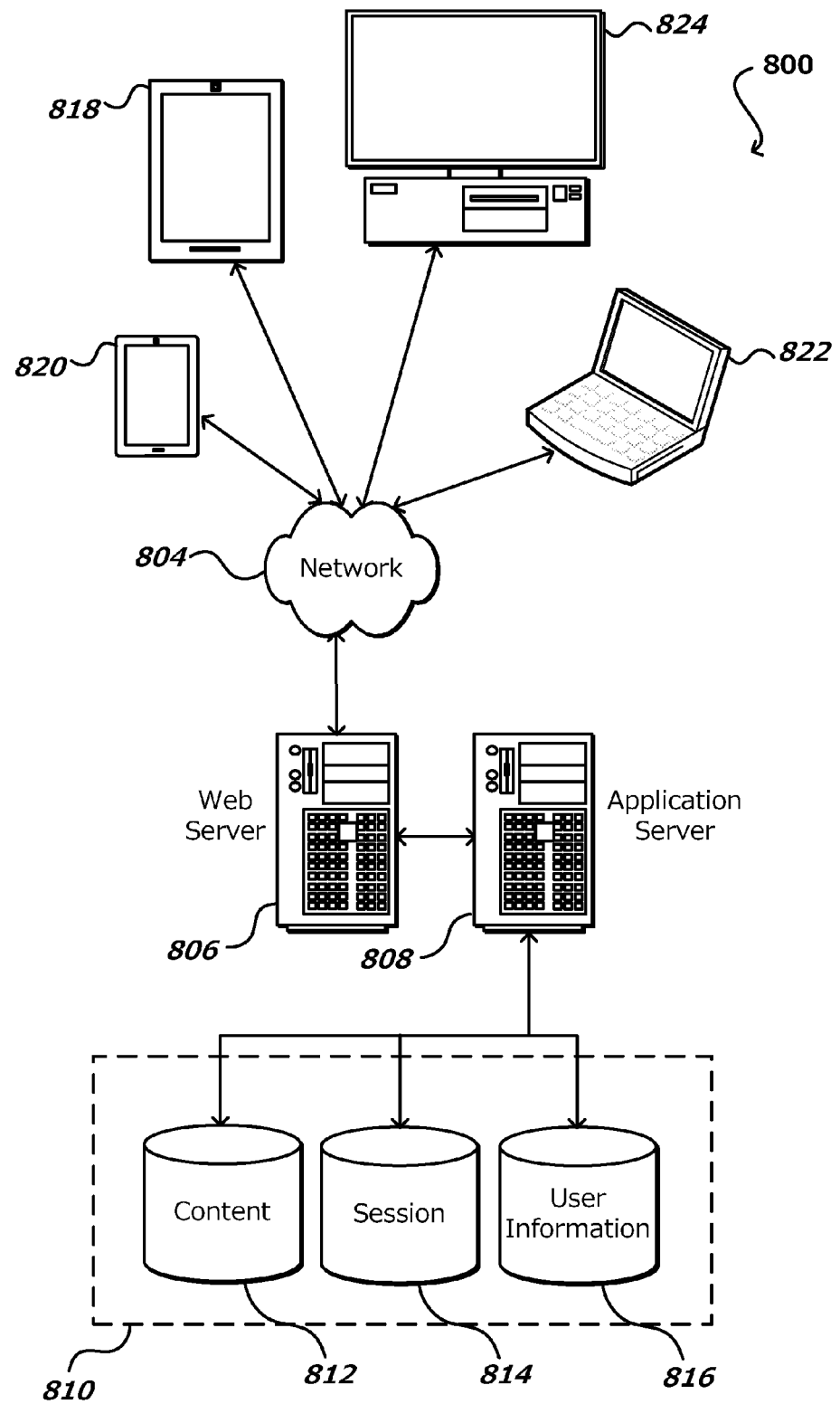
FIG. 8 illustrates an environment in which various embodiments can be implemented.

FIG. 5 illustrates an example process for enhancing an image in accordance with various embodiments. It should be understood that there can be additional, fewer, or alternative steps performed in similar or alternative orders, or in parallel, within the scope of the various embodiments unless otherwise stated. A user of a computing device (e.g., a mobile phone, a tablet computer, etc.) can use the camera to capture an image of a scene or subject matter(s) of interest. The image can be transmitted over a network and received 502 at a network service (e.g., networked image service) operating on a remote server for processing. The image can be transmitted along with metadata associated with the image (e.g., data tagged with the image, information related to the image, etc.). As described, the metadata can be obtained by sensor(s) of the device can be stored along with the image. For example, the metadata can include (but is not limited to) geolocation information at substantially where the image was captured, a direction at which the camera of the device was pointing while capturing the image, a time of day/year when the image was captured, data inputted by the user to provide one or more details about the image, and/or other information related to the image.

The network service can communicate with a database that includes one or more image and/or patches of images. As described, the images can include entire scenes and/or objects, or portions of those scenes or objects. The images can include images that have been enhanced through image enhancement processes, which can include, for example, adjusting each of the images (or portions of the images) by one or more human experts or other automated image editing processes. The adjusted patches can be linked to the original unimproved sections of the same image. Additionally, in many embodiments, the procedure by which the sections were modified can be stored with the sections.

Upon receiving the image, the network service can compare 504 each of a plurality of image portions of the image against a library of image patches, each image patch of the library of image patches representing at least a portion of at least one object and having undergone at least one image modification, to locate 506 a matching image patch of the library of image patches that is determined to match a matching image portion of the plurality of image portions of the image. For example, for the image portions for the image, the network service can search for unimproved patches that substantially match (i.e., matches within an allowable threshold) a respective image portion. If a matching unimproved patch is found for a respective image portion, the respective image portion can be modified using an enhanced patch that corresponds to the matching unimproved patch (i.e., the enhanced patch is in the same patch group/pair as the unimproved patch). For example, the image modification, which was applied to the matching image patch, can be applied to the matching image portion to generate 510 a second image (e.g., an enhanced image) including at least the modified matching portion, the second image being an enhanced version of the first image. In some embodiments, the respective image portion can be modified using (e.g., replaced by, merged with, etc.) the enhanced patch corresponding to the unimproved patch that matches the respective image portion. In other embodiments, rather than use the enhanced patch from the database, the network service can use stored procedure information from the database for how the enhanced patch was modified and apply that procedure to the image portion. The procedure can be applied to the image portion based at least in part on how well the image portion matched the unimproved patch.

The enhanced image can be provided 512 to the computing device from the remote server, and the enhanced and/or the original image can be presented to the user. The user can be presented a prompt on whether to accept, save, or discard either image. The accepted (and in some instances the discarded) images can be stored on the computing device and/or the remote server, such as in a database located on or separate from the remote server. In accordance with an embodiment, the images stored on the remote server can be made accessible to the computing device. For example, the user may have created an account with a service that provides a cloud-based photo album, and the user can decide to store certain images in the cloud-based photo album.

What is claimed is:

1. A computing device, comprising:
at least one processor; and
memory including instructions that, when executed by the at least one processor, cause the computing device to:
  receive a first image captured by an image sensor of a client device;
  compare each of a plurality of image portions of the first image against a library of image patches, each image patch of the library of image patches representing at least a portion of at least one object and having undergone at least one image modification process;
  locate a matching image patch of the library of image patches that is determined to match a matching image portion of the plurality of image portions of the first image;
  locate the at least one image modification process associated with the matching image patch in a database;
  apply the at least one image modification process associated with the matching image patch to the matching image portion to generate a modified matching image portion; and
  generate a second image that includes at least the modified matching image portion, the modified matching image portion having undergone the at least one image modification process, wherein the second image is an enhanced version of the first image.

2. The computing device of claim 1, wherein the instructions when executed further cause the computing device to:
  determine a second image modification process applied to a second matching image patch determined to match a second matching image portion, wherein the second image modification process is different than the at least one image modification process; and
  apply the second image modification process to the second matching image portion.

3. The computing device of claim 1, wherein applying the at least one image modification process further includes performing at least one of merging the matching image patch of the library of image patches with the matching image portion of the plurality of image portions of the first image, adjusting a color of the matching image portion to match the color of the matching image patch, adjusting a hue of the matching image portion to match the hue of the matching image patch, or adjusting a sharpness of the matching image portion to match the sharpness of the matching image patch.

4. The computing device of claim 1, wherein the instructions when executed further cause the computing device to:
  determine a lens type and an image sensor type of the client device based at least in part on metadata associated with the first image; and
  apply one or more image processing algorithms to the first image to remove at least one image artifact caused by one of the lens type or the image sensor type.

5. A computer implemented method, comprising:
obtaining an image;
comparing one or more portions of the image against a library of image patches;
determining a matching image patch of the library of image patches that substantially matches a matching image portion of the one or more portions of the image;
identifying at least one modified image patch associated with the matching image patch;
locating, in a database, image modification information for the at least one modified image patch; and
modifying the matching image portion, using the image modification information for the at least one modified image patch, to alter at least one aspect of the matching image portion.

6. The computer-implemented method of claim 5, wherein the determining step further includes:
  comparing a set of pixels of the matching image patch to a set of pixels of the matching image portion, wherein the comparing utilizes at least one of line detection, edge detection, feature detection, image color comparison, image texture comparison, image shape comparison, or image distance measurement.

7. The computer-implemented method of claim 5, further comprising:
  processing metadata associated with the image, wherein the metadata indicates at least one of a geolocation of a computing device at a time when the image was acquired using a camera of the computing device, a direction at which the camera was facing at the time when the image was acquired, a temporal aspect of when the image was acquired, a subject matter associated with the image, or a description associated with the image; and
  selecting a subset of a plurality of library image patches based at least in part on the metadata.

8. The computer-implemented method of claim 5, wherein the modifying step further includes:
  merging the matching image portion with the at least one modified image patch to alter the matching image portion, or
  determining at least one image enhancement process applied to the at least one modified image patch; and
  applying the determined at least one image enhancement process to the matching image portion to alter the matching image portion.

9. The computer-implemented method of claim 8, wherein applying the determined at least one image enhancement process further includes:
  determining one or more neighboring image portions to the matching image portion; and
  applying the determined at least one image enhancement process to the one or more neighboring image portions.

10. The computer-implemented method of claim 8, wherein merging the matching image portion with the at least one modified image patch further comprises:
  performing at least one of averaging pixel values for corresponding pixel locations, weighted averaging pixel values for corresponding pixel locations, or interpolating pixel values for corresponding pixel locations in the matching image portion and in the at least one modified image patch.

11. The computer-implemented method of claim 5, wherein the determining step further includes:
  determining a subset of the library of image patches stored in a database based at least in part on metadata included in the image, wherein each library image patch of the subset of the library image patches is associated with one or more modified image patches; and
  searching the subset of the library of image patches to determine the at least one modified image patch that substantially matches the matching image portion.

12. The computer-implemented method of claim 11, wherein at least a subset of the library of image patches has been modified by a person.

13. The computer-implemented method of claim 5, wherein the one or more portions includes at least one of one or more square portions, rectangle portions, triangle portions, regions, or region shapes.

14. The computer-implemented method of claim 5, further comprising:
  providing a processed image and an original image to a computing device for display on a display element of the computing device, the processed image at least including the modified matching image portion.

15. The computer-implemented method of claim 5, wherein the steps of obtaining, comparing, determining, identifying, locating, and modifying are performed by a network service located on one or more networked servers in communication with a computing device.

16. A non-transitory computer readable storage medium storing one or more sequences of instructions executable by one or more processors to perform a set of operations comprising:
  obtaining an image;
  comparing one or more portions of the image against a library of image patches;
  determining a matching image patch of the library of image patches that substantially matches a matching image portion of the one or more portions of the image;
  identifying at least one modified image patch associated with the matching image patch;
  locating, in a database, image modification information for the at least one modified image patch; and
  modifying the matching image portion, using the image modification information for the at least one modified image patch, to alter at least one aspect of the matching image portion.

17. The non-transitory computer-readable storage medium of claim 16, wherein the modifying step further includes:
  merging the matching image portion with the at least one modified image patch to alter the matching image portion; or
  replacing the matching image portion with the at least one modified image patch to alter the matching image portion, or
  determining at least one image enhancement process applied to the at least one modified image patch; and
  applying the determined at least one image enhancement process to the matching image portion to alter the matching image portion.

18. The non-transitory computer-readable storage medium of claim 16, wherein at least some of the one or more portions are included in a library that includes the library of image patches and are utilized as library image patches, and wherein the library is hosted on one or more networked servers configured to communicate with at least one network service.

19. The non-transitory computer-readable storage medium of claim 16, wherein the library of image patches are obtained from at least one of a social networking service, a networked image storage service, or a computing device used to acquire the image.

20. The non-transitory computer-readable storage medium of claim 16, wherein the modifying step further includes:
  determining a resolution of the one or more portions of the image; and
  adjusting the resolution of the one or more portions of the image to match a resolution of at least one patch of the library of image patches.

* * * * *